US012574253B2

(12) United States Patent  (10) Patent No.:  US 12,574,253 B2
Andre et al.  (45) Date of Patent:  Mar. 10, 2026

(54) SECURE COMMUNICATIONS BETWEEN EDGE CLUSTERS AND CLUSTER MANAGEMENT SYSTEM

(71) Applicant: Dell Products L.P., Round Rock, TX (US)

(72) Inventors: Emmanuel Andre, Singapore (SG); Yedukondalu Vanipenta, Singapore (SG); Bradley K. Goodman, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 573 days.

(21) Appl. No.: 18/195,453

(22) Filed: May 10, 2023

(65) Prior Publication Data

US 2024/0380610 A1  Nov. 14, 2024

(51) Int. Cl.
*H04L 9/32* (2006.01)
*H04L 9/40* (2022.01)

(52) U.S. Cl.
CPC ........ *H04L 9/3263* (2013.01); *H04L 63/0869* (2013.01); *H04L 63/166* (2013.01)

(58) Field of Classification Search
CPC . H04L 9/3263; H04L 63/0869; H04L 63/166; H04L 63/0823
See application file for complete search history.

(56) References Cited

U.S. PATENT DOCUMENTS

| | | | | |
|---|---|---|---|---|
| 12,323,537 | B1 * | 6/2025 | Sethi | H04L 67/133 |
| 2020/0028699 | A1 * | 1/2020 | Sharifi Mehr | H04L 9/14 |

OTHER PUBLICATIONS

Rancher, "Simple, Secure, Multi-Cluster Kubernetes with Rancher Prime," https://www.rancher.com/products/rancher, Accessed Feb. 8, 2023, 6 pages.
FIDO Alliance, "FIDO Device Onboard: A Specification for Automated, Secure IoT Provisioning Technology," https:// fidoalliance. org/intro-to-fido-device-onboard/, Apr. 20, 2021, 4 pages.
(Continued)

*Primary Examiner* — Baotran N To
(74) *Attorney, Agent, or Firm* — Ryan, Mason & Lewis, LLP

(57) ABSTRACT

An apparatus comprises at least one processing device configured to establish a first secure communication channel between at least one edge computing site and a management system, and to send a certificate signing request over the first secure communication channel from the at least one edge computing site to the management system. The processing device is further configured to receive, over the first secure communication channel from the management system in response to the certificate signing request, a digitally signed certificate for the at least one edge computing site and a certificate authority certificate. The processing device is still further configured to establish a second secure communication channel between the at least one edge computing site and the management system. The second secure communication channel utilizes a mutual authentication protocol. The certificate authority certificate and the digitally signed certificate are used to establish the second secure communication channel.

20 Claims, 8 Drawing Sheets

300

ESTABLISHING A FIRST SECURE COMMUNICATION CHANNEL BETWEEN AT LEAST ONE EDGE COMPUTING SITE AND A MANAGEMENT SYSTEM — 302

SENDING A CERTIFICATE SIGNING REQUEST OVER THE FIRST SECURE COMMUNICATION CHANNEL FROM THE AT LEAST ONE EDGE COMPUTING SITE TO THE MANAGEMENT SYSTEM — 304

RECEIVING, OVER THE FIRST SECURE COMMUNICATION CHANNEL FROM THE MANAGEMENT SYSTEM IN RESPONSE TO THE CERTIFICATE SIGNING REQUEST, A DIGITALLY SIGNED CERTIFICATE FOR THE AT LEAST ONE EDGE COMPUTING SITE AND A CERTIFICATE AUTHORITY CERTIFICATE — 306

ESTABLISHING A SECOND SECURE COMMUNICATION CHANNEL BETWEEN THE AT LEAST ONE EDGE COMPUTING SITE AND THE MANAGEMENT SYSTEM, WHEREIN THE SECOND SECURE COMMUNICATION CHANNEL UTILIZES A MUTUAL AUTHENTICATION PROTOCOL, AND THE CERTIFICATE AUTHORITY CERTIFICATE AND THE DIGITALLY SIGNED CERTIFICATE ARE USED TO ESTABLISH THE SECOND SECURE COMMUNICATION CHANNEL — 308

(56) References Cited

OTHER PUBLICATIONS

VMware, "VMware Cloud Foundation Administration Guide," VMware Cloud Foundation 4.3, Aug. 24, 2021, 316 pages.

The Kubernetes Authors, "Authenticating," https://kubernetes.io/docs/reference/access-authn-authz/authentication/#x509-client-certs, Accessed Feb. 8, 2023, 22 pages.

Github, "Open Horizon," https://open-horizon.github.io/, Accessed Feb. 8, 2023, 1 page.

Microsoft, "Create an Ingress Controller in Azure Kubernetes Service (AKS)," https://learn.microsoft.com/en-us/azure/aks/ingress-basic?tabs=azure-cli, Mar. 8, 2023, 14 pages.

Cloudfare, Inc., "What is mutual TLS (mTLS)?" https://www.cloudflare.com/learning/access-management/what-is-mutual-tls/, Accessed Apr. 20, 2023, 7 pages.

K. Brush et al., "Asymmetric Cryptography (public key cryptography)." https://www.techtarget.com/searchsecurity/definition/asymmetric-cryptography#:~:text=Asymmetric%20cryptography%2C%20also%20known%20as,from%20unauthorized%20access%20or%20use., Accessed Apr. 24, 2023, 5 pages.

R, Awati et al, "Certificate Authority (CA)," https://www.techtarget.com/searchsecurity/definition/certificate-authority, Accessed Apr. 20, 2023, 6 pages.

V. Fulber-Garcia, "Public/Private Keys Vs.Certificates," https://www.baeldung.com/cs/public-private-keys-vs-certificates, Mar. 16, 2023, 9 pages.

A. Woland, "How does certificate-based authentication work?" https://www.networkworld.com/article/2226498/infrastructure-management-simply-put-how-does-certificate-based-authentication-work.html, May 10, 2021, 8 pages.

LoginID, "FIDO Device Onboarding," https://docs.loginid.io/fdo/, Accessed Apr. 21, 2023, 3 pages.

FIDO Alliance, "Client to Authenticator Protocol (CTAP)," https://fidoalliance.org/specs/fido-v2.2-rd-20230321/fido-client-to-authenticator-protocol-v2.2-rd-20230321.html, Mar. 21, 2023, 132 pages.

Rancher, "What is Rancher," https://www.rancher.com/, Accessed May 10, 2023, 5 pages.

* cited by examiner

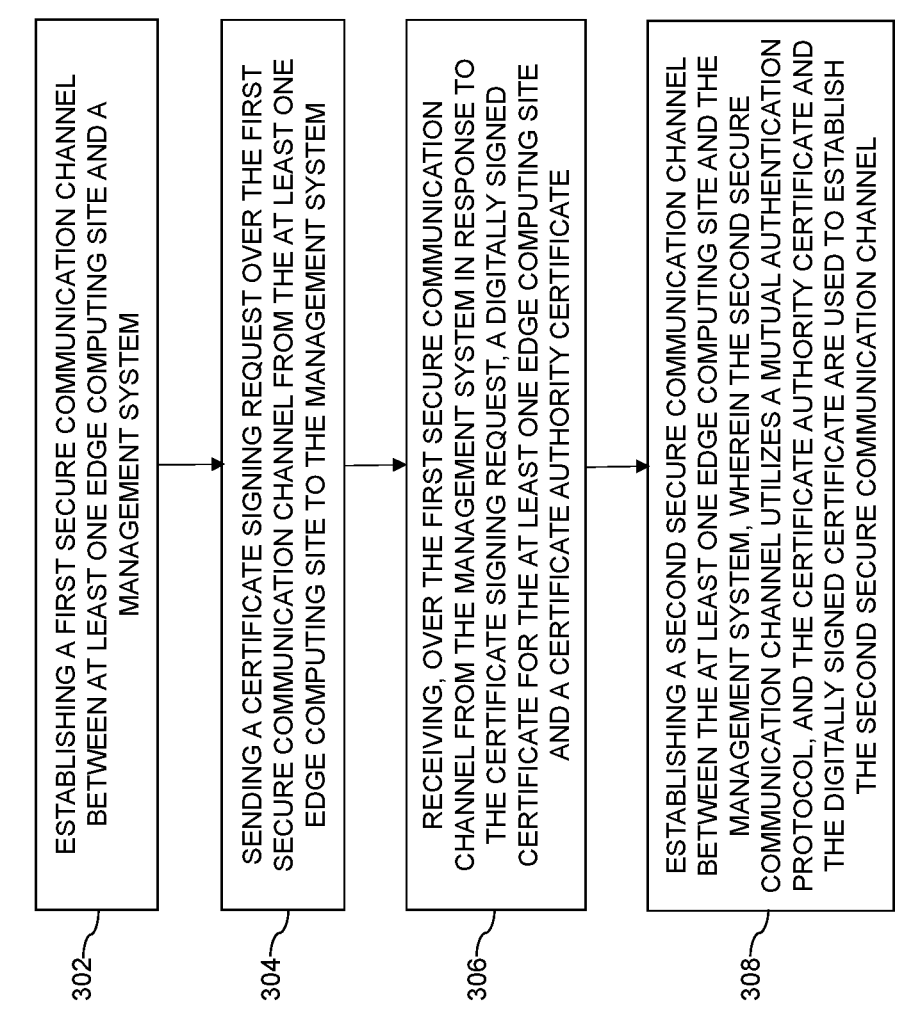

300

302 — ESTABLISHING A FIRST SECURE COMMUNICATION CHANNEL BETWEEN AT LEAST ONE EDGE COMPUTING SITE AND A MANAGEMENT SYSTEM

304 — SENDING A CERTIFICATE SIGNING REQUEST OVER THE FIRST SECURE COMMUNICATION CHANNEL FROM THE AT LEAST ONE EDGE COMPUTING SITE TO THE MANAGEMENT SYSTEM

306 — RECEIVING, OVER THE FIRST SECURE COMMUNICATION CHANNEL FROM THE MANAGEMENT SYSTEM IN RESPONSE TO THE CERTIFICATE SIGNING REQUEST, A DIGITALLY SIGNED CERTIFICATE FOR THE AT LEAST ONE EDGE COMPUTING SITE AND A CERTIFICATE AUTHORITY CERTIFICATE

308 — ESTABLISHING A SECOND SECURE COMMUNICATION CHANNEL BETWEEN THE AT LEAST ONE EDGE COMPUTING SITE AND THE MANAGEMENT SYSTEM, WHEREIN THE SECOND SECURE COMMUNICATION CHANNEL UTILIZES A MUTUAL AUTHENTICATION PROTOCOL, AND THE CERTIFICATE AUTHORITY CERTIFICATE AND THE DIGITALLY SIGNED CERTIFICATE ARE USED TO ESTABLISH THE SECOND SECURE COMMUNICATION CHANNEL

```
openssl req -x509 -newkey rsa:4096 -keyout 'ca.key' -sha384 -out 'ca.crt' -days 10000 -nodes
subj "/C=SG/ST=Singapore/L=Singapore/O=ACME/OU=IT Department/CN=mydomain.com"

openssl x509 -req -days 10000 -set_serial 01 -in server-req.pem -out server-cert.pem -
CA ca.crt -CAkey ca.key
```

```
# Generate a private key with TPM
tpm2tss-genkey -a ecdsa key.tss
# Generate a CSR with TPM
openssl req -engine tpm2tss -new -key key.tss -keyform engine -out client.csr
```

```
openssl x509 -sha384 -req -CA 'ca.crt' -CAkey 'ca.key' -CAcreateserial -days 365 -in
"mydomain.com.csr" -out "client.crt"
```

```
curl --engine tpm2tss -key-type ENG -client.crt -key key.tss --cacert ca.crt -v
https://<edge_cluster_manager_url>
```

FIG. 4D

SECURE COMMUNICATIONS BETWEEN EDGE CLUSTERS AND CLUSTER MANAGEMENT SYSTEM

FIELD

The field relates generally to information processing, and more particularly to management of information processing systems.

BACKGROUND

Computing devices may be deployed to various customer or other end-user sites, such as "edge" computing sites which are remote from a management computing site operated by a manufacturer, vendor or other provider of such computing devices. In these and other cases, computing device onboarding and management are complex tasks, particularly for computing devices that are to be provisioned remotely and are part of a cluster. Device onboarding and management may include enabling computing devices to support various protocols and encryption for secure communication with the management computing site. Device onboarding and management may be further utilized for enabling various functionality on the computing devices, including but not limited to functionality for access control, backup and storage, continuity and recovery, protection against hacking and viruses/malware, etc.

SUMMARY

Illustrative embodiments of the present disclosure provide techniques for enabling secure communications between a computing device cluster and a cluster management system.

In one embodiment, an apparatus comprises at least one processing device comprising a processor coupled to a memory. The at least one processing device is configured to establish a first secure communication channel between at least one edge computing site and a management system, and send a certificate signing request over the first secure communication channel from the at least one edge computing site to the management system. The at least one processing device is further configured to receive, over the first secure communication channel from the management system in response to the certificate signing request, a digitally signed certificate for the at least one edge computing site and a certificate authority certificate. The at least one processing device is still further configured to establish a second secure communication channel between the at least one edge computing site and the management system. The second secure communication channel utilizes a mutual authentication protocol. The certificate authority certificate and the digitally signed certificate are used to establish the second secure communication channel.

These and other illustrative embodiments include, without limitation, methods, apparatus, networks, systems and processor-readable storage media.

BRIEF DESCRIPTION OF THE DRAWINGS

FIG. 3 is a flow diagram of an exemplary process for secure communications between a computing device cluster and a cluster management system in an illustrative embodiment.

FIG. 4A depicts example pseudocode for generation of a certificate authority and generation and storage of certificates and private keys in an illustrative embodiment.

FIG. 4B depicts example pseudocode for generation of a private key with a trusted platform module (TPM) and generation of a certificate signing request (CSR) with a TPM in an illustrative embodiment.

FIG. 4C depicts example pseudocode for return of a signed client certificate and provision of a certificate authority certificate from a cluster management system to an edge computing site in an illustrative embodiment.

FIG. 4D depicts example pseudocode for establishing a mutual transport layer security (mTLS) connection with a cluster manager using the certificate authority certificate, a client certificate and a private client key in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
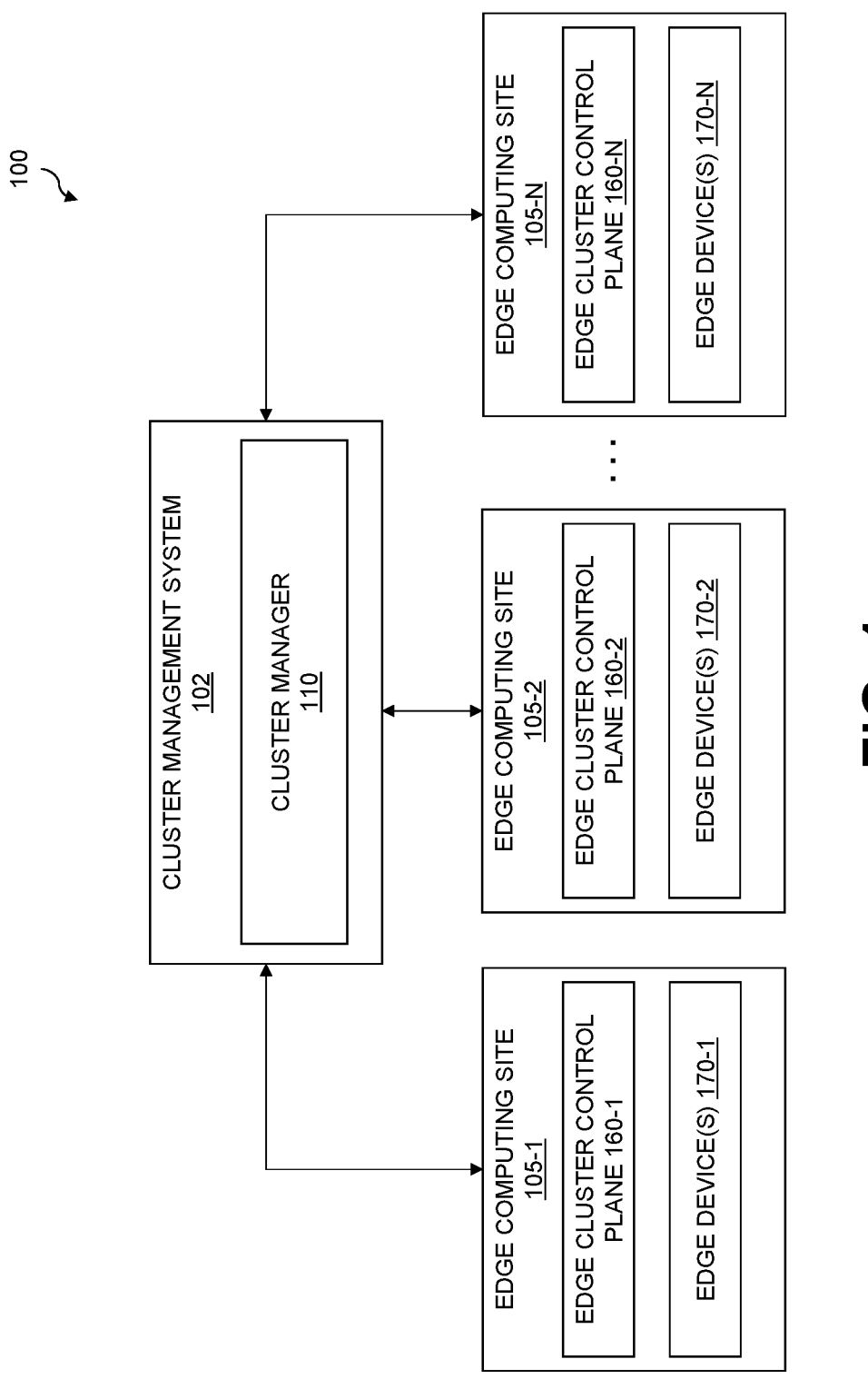
FIG. 1 is a block diagram of an information processing system configured for secure communications between one or more computing device clusters and a cluster management system in an illustrative embodiment.

FIG. 1 shows an information processing system 100 configured in accordance with an illustrative embodiment. The information processing system 100 is assumed to be built on at least one processing platform and provides functionality for establishing and maintaining secure communications between a cluster management system 102 and a set of edge computing sites 105-1, 105-2, . . . 105-N (collectively, edge computing sites 105). In illustrative embodiments, each of the edge computing sites 105 comprises a cluster of one or more edge devices 170-1, 170-2, . . . 170-N (collectively, edge devices 170). As used herein, an "edge computing site" refers to an edge compute endpoint (ECE) comprising, but not necessarily limited to, servers, gateways and/or computers located at an edge location where computing occurs. As used herein, a "cluster management system" refers to a management platform that enables provisioning and operations of multiple clusters such as, for example, clusters of edge devices. In a non-limiting example, a cluster management system may include an open-source container orchestration system (e.g., Rancher®), which is configured for automating software deployment, scaling, and management.

In illustrative embodiments, the edge computing sites 105 respectively comprise edge cluster control planes 160-1, 160-2, . . . 160-N (collectively, "edge cluster control planes" 160). As used herein, an "edge cluster control plane" refers to a node or set of nodes that control and manage a set of worker nodes for performing workloads at runtime. In illustrative embodiments, a cluster comprises the edge cluster control plane node(s) and the worker nodes. A cluster may include a plurality of edge devices 170 that make up the edge cluster control plane node(s) and the worker nodes at an edge computing site 105.

The edge computing sites 105 may represent different customer sites or other data centers or computing sites that are remote from the cluster management system 102. In some embodiments, however, one or more of the edge computing sites 105 may be co-located with the cluster management system 102 (e.g., at a same data center, a same cloud infrastructure, etc.). The management system 102 is assumed to comprise a plurality of devices or nodes (e.g., physical and virtual computing resources or other information technology (IT) assets not shown in FIG. 1) that implement the cluster manager 110 and an onboarding service (e.g., onboarding service 130 in FIG. 2), enabling provisioning and configuration of sets of edge devices 170 deployed at the edge computing sites 105.

The edge devices 170 may comprise, for example, physical computing devices such as Internet of Things (IoT) devices, mobile telephones, laptop computers, tablet computers, desktop computers or other types of devices. Such devices are examples of what are more generally referred to herein as "processing devices." Some of these processing devices are also generally referred to herein as "computers." The edge devices 170 may also or alternately comprise virtualized computing resources, such as virtual machines (VMs), containers, etc.

The edge devices 170 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

Networks coupling the edge computing sites 105 and the cluster management system 102 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

In some embodiments, the cluster management system 102 and edge computing sites 105 collectively provide at least a portion of an information technology (IT) infrastructure operated by an enterprise. The IT infrastructure comprising the cluster management system 102 and the edge computing sites 105 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the cluster management system 102 and/or the edge computing sites 105. A given enterprise system may host assets that are associated with multiple enterprises (e.g., two or more different businesses, organizations or other entities). For example, in some cases different ones of the edge computing sites 105 are associated with different enterprises (e.g., different customers or end-users) which purchase devices from another enterprise that is an operator of the cluster management system 102 (e.g., a manufacturer or vendor of the edge devices 170 deployed at the edge computing sites 105).

Although not explicitly shown in FIG. 1, one or more input-output devices such as keyboards, displays or other types of input-output devices may be used to support one or more user interfaces to the cluster management system 102 and the edge computing sites 105, as well as to support communication between the cluster management system 102, the edge computing sites 105, and other related systems and devices not explicitly shown.

Figure 2:
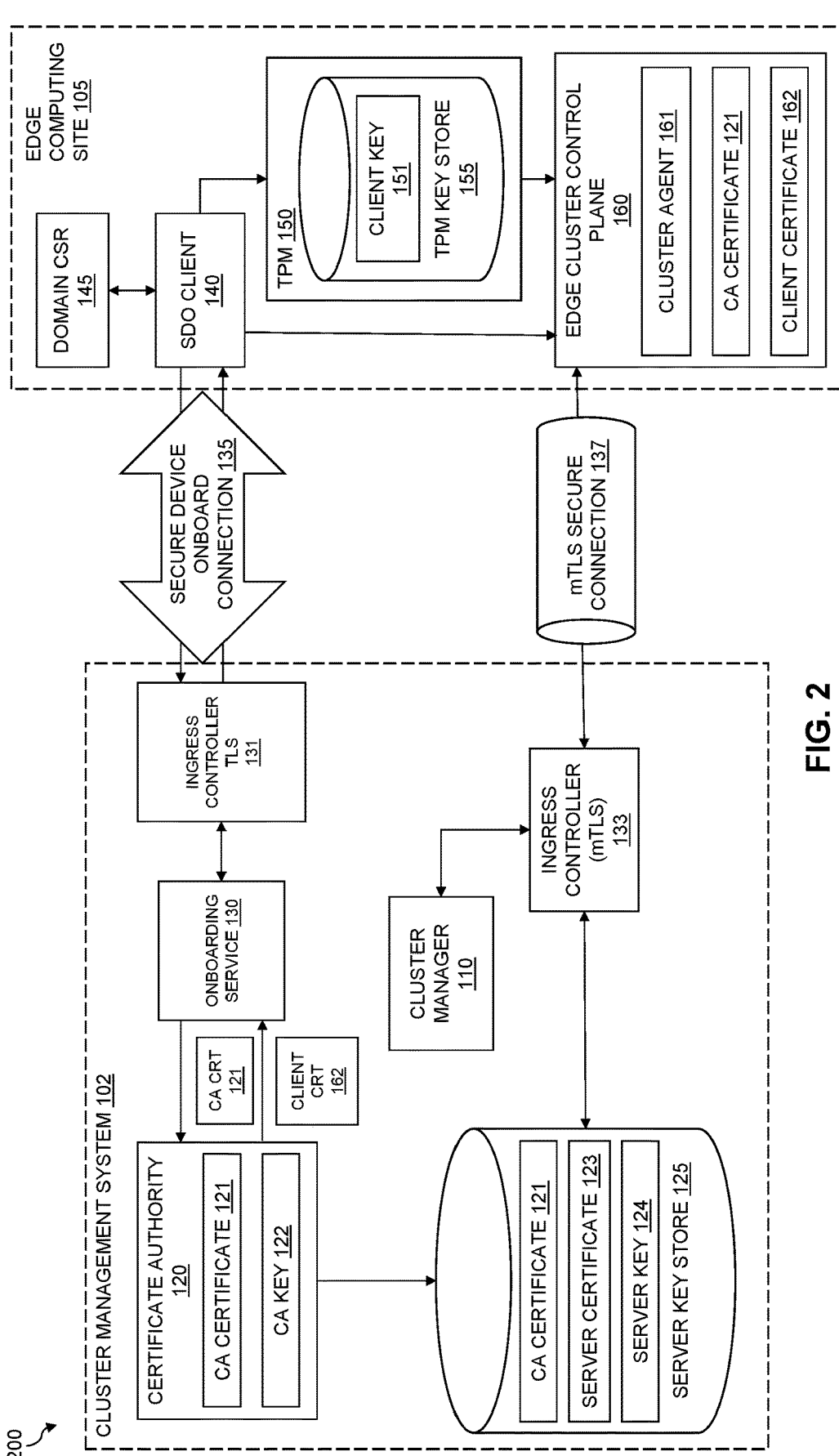
FIG. 2 shows an architectural diagram including an operational flow depicting provisioning of computing devices and secure communications between a computing device cluster and a cluster management system in an illustrative embodiment.

FIG. 2 shows an architectural diagram including an operational flow 200 depicting provisioning of computing devices (e.g., edge devices 170) and secure communications between an edge computing site 105 (e.g., a computing device cluster) and a cluster management system 102. In addition to the cluster manager 110 discussed in connection with the information processing system 100 of FIG. 1, the cluster management system 102 includes a certificate authority 120, a server key store 125, an onboarding service 130 and ingress controllers 131 and 133. As explained in more detail herein, the certificate authority 120 generates a certificate authority (CA) certificate 121 and a certificate authority (CA) key 122. The certificate authority 120 also generates a server certificate 123 and a server key 124 associated with a server on which the cluster management system 102 runs. The CA certificate 121, server certificate 123 and server key 124 are stored in the server key store 125. The CA key 122 and server key 124 are private keys.

In addition to the edge cluster control plane 160 and edge devices 170 discussed in connection with the information processing system 100 of FIG. 1, an edge computing site 105 includes a secure device onboarding (SDO) client 140 and TPM 150. The SDO client 140 generates a domain certificate signing request (CSR) 145 in connection with provisioning (e.g., secure device onboarding) of a computing device (e.g., a computing device on which the edge cluster control plane 160 and corresponding cluster agent 161 run). For example, as noted herein above, the edge cluster control plane 160 refers to a node or set of nodes (one or more edge devices 170) that control and manage a set of worker nodes (e.g., remaining edge devices 170) for performing workloads at runtime. A client key 151 associated with the computing device on which the edge cluster control plane 160 and corresponding cluster agent 161 run is stored in the TPM key store 155 of the TPM 150. In illustrative embodiments, multiple instances of the cluster agent 161 are installed on multiple edge devices 170.

In illustrative embodiments, the secure device onboarding of the computing device associated with the edge cluster control plane 160 is performed using zero touch provisioning. As used herein, "zero touch" provisioning refers to configuration or other provisioning of a computing device that does not require manual intervention. Thus, zero touch provisioning enables the computing device to be configured or otherwise provisioned without needing a human operator to physically type or otherwise provide input into a system console of the computing device being provisioned. As described in further detail below, zero touch provisioning in some cases only requires that a computing device be placed in some desired location and connected to power and a network (e.g., either via a physical network cable or via a wireless network interface). Zero touch provisioning advantageously enables provisioning of a computing device remotely (e.g., through the SDO client 140 of the edge computing site 105 and the onboarding service 130 of the cluster management system 102) and automatically.

The server key store 125, TPM key store 155 and other databases or data stores may be implemented using one or more of storage systems that are part of or otherwise associated with one or more of the cluster management system 102 and the edge computing sites 105. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

An enterprise may manage a plurality of clusters, with each cluster having its own configuration and access-control settings. With conventional approaches, configuring access to and managing a large number (e.g., hundreds, thousands, etc.) of clusters creates technical problems that waste valuable compute resources and require manual intervention. These problems are magnified when the clusters are in different locations (e.g., edge locations) and on different networks from each other.

The embodiments provide a cluster management system that enables users to control edge clusters or groups of edge clusters from a central location, while also providing techniques for the secure onboarding of and secure communications with the edge computing sites being managed by the cluster management system. Conventional security approaches rely on token-based authentication, where an authentication token must be passed to a cluster when the cluster is imported to a management system. Since conventional token-based authentication relies on a shared secret which can be intercepted and/or leaked, it is not sufficient to meet zero-trust security requirements. As used herein, "zero-trust" refers to a security framework requiring all users, whether inside or outside a network of an enterprise or other organization, to be authenticated, authorized, and continuously validated for security configuration and posture before being granted or maintaining access to applications and data. In a zero-trust framework, no user, device or network traffic is trusted by default. Zero-trust assumes that there is no traditional network edge; networks can be local, in the cloud, or a combination or hybrid with resources anywhere, as well as users in any location.

The illustrative embodiments provide a cluster management system (e.g., cluster management system 102) to orchestrate containerization for shifting thousands of applications and services to the edge. Since ECEs (e.g., edge computing sites 105) can run in non-trusted network environments, it is crucial to enhance the default security (e.g., token-based) that is used by conventional cluster management systems. For example, a token is typically manually provisioned on a managed cluster, which does not meet the zero-touch provisioning requirement for ECEs.

The embodiments advantageously provide technical solutions to modify the security mechanisms by utilizing a mutual authentication protocol (e.g., mTLS) to secure connections between a cluster management system and edge clusters. mTLS allows use of keys which are asymmetric. Unlike conventional approaches, mTLS does not rely on shared secrets that cannot be protected from unwanted intercepts or leaks. mTLS requires mutual authentication by verifying that that devices at each end of a network connection have the correct private key. The information in their respective transport layer security (TLS) certificates provides additional verification. TLS is an encryption protocol which authenticates the server in a client-server connection and encrypts communications between the client and server. TLS employs public key cryptography, utilizing a pair of keys (a public key and a private key). Data encrypted with the public key can be decrypted only with the private key. For example, a device that decrypts a message that was encrypted with a public key verifies that the device possesses the private key. The public key is available through the TLS certificate of a domain or device. As used herein, a "certificate" refers to a data file that includes information for verifying the identity of a device (e.g., server, edge device (client)). The information includes, for example, the public key, an identification of the issuing authority of the certificate (e.g., certificate authority), and an expiration date of the certificate. A handshake refers to a process for verifying a certificate and a device's possession of the private key. The handshake can also establish how encryption will take place once the handshake is finished.

In TLS, the server has a certificate and a public/private key pair, while the client does not have a certificate and a public/private key pair. When establishing a TLS connection, the client connects to the server, the server provides its certificate to the client and the client verifies the server's certificate. Then information can be exchanged over an encrypted TLS connection. With mTLS, the client and server each have a certificate, and both sides authenticate using their public/private key pair. When compared with TLS, mTLS requires additional steps to verify each party. For example, when establishing an mTLS connection, the client connects to the server, the server provides its certificate to the client the client verifies the server's certificate, the client provides its certificate to the server, the server verifies the client's certificate and the server grants access so that the client and server can exchange information over an encrypted mTLS connection.

The embodiments advantageously manage the private keys using TPMs or other types of security processors (SPs), which are purpose-built, highly secured hardware components designed to generate, retain and enable use of such keys by a specific computer (or cluster endpoint), while only allowing such use when the machine is in a "good security posture". As used herein, a "good security posture" refers to a determined secure state of a device, computer, machine and/or endpoint. The determined secure state includes a determination that the device, computer, machine and/or endpoint has not been subject to unauthorized altering or tampering, and may be determined based at least in part on secure boot, measured boot and TPM metrics.

Advantageously, the use of mTLS in the embodiments ensures that traffic is secure and trusted in both directions between a client and a server, providing an additional layer of security for users who log in to an enterprise's or other organization's network or applications. mTLS also provides a mechanism for verifying connections with client devices that do not follow a login process, such as in the case of some ECEs. mTLS prevents various kinds of attacks, including on-path, spoofing, credential, brute force and phishing attacks, as well as malicious API requests.

As an additional advantage, since edge devices may be managed by non-information technology (non-IT) personnel, the embodiments employ zero touch provisioning to onboard devices to the cluster management system 102. With zero touch provisioning, an edge computing site 105 (e.g., ECE) configures and onboards itself automatically without user intervention. The embodiments advantageously provide technical solutions to combine SDO, TPM and mTLS techniques to enable zero-trust security and zero touch provisioning in connection with the management of edge clusters.

Referring back to FIGS. 1 and 2, although there are elements that are depicted as being part of the cluster management system 102 and edge computing sites 105 in the FIG. 1 and the FIG. 2 embodiments, such elements or at least a portion thereof may in other embodiments be implemented at least in part externally to the cluster management system 102 or edge computing sites 105, for example, as a stand-alone server, set of servers or other type of system coupled via one or more networks to the cluster management system 102 and/or the edge computing sites 105.

The cluster management system 102 and the edge computing sites 105 in the FIG. 1 and the FIG. 2 embodiments are assumed to be implemented using at least one processing device. Each such processing device generally comprises at least one processor and an associated memory, and implements at least a portion of the functionality of, for example, the cluster manager 110, certificate authority 120, server key store 125, onboarding service 130 and ingress controllers 131 and 133 of the cluster management system 102, and at least a portion of the functionality of, for example, the SDO client 140, TPM 150 and edge cluster control plane 160 of the edge computing site 105.

It is to be appreciated that the particular arrangement of the cluster management system 102 and the edge computing sites 105 illustrated in the FIG. 1 and the FIG. 2 embodiments is presented by way of example only, and alternative arrangements can be used in other embodiments. As discussed above, for example, elements that are depicted as being part of the cluster management system 102 and edge computing sites 105 in the FIG. 1 and the FIG. 2 embodiments may be implemented at least in part external to the cluster management system 102 and the edge computing sites 105. At least portions of the cluster manager 110, certificate authority 120, server key store 125, onboarding service 130 and ingress controllers 131 and 133 of the cluster management system 102, and at least portions of the SDO client 140, TPM 150 and edge cluster control plane 160 of the edge computing site 105 may be implemented at least in part in the form of software that is stored in memory and executed by a processor.

It is to be understood that the particular set of elements shown in FIGS. 1 and 2 are presented by way of illustrative example only, and in other embodiments additional or alternative elements may be used. Thus, another embodiment may include additional or alternative systems, devices and other network entities, as well as different arrangements of modules and other components.

The cluster management system 102, the edge computing sites 105 and other portions of the system 100, as described above and in further detail below, may be part of a cloud infrastructure.

The cluster management system 102, the edge computing sites 105 and other components of the information processing system 100 in the FIG. 1 and the FIG. 2 embodiments are assumed to be implemented using at least one processing platform comprising one or more processing devices each having a processor coupled to a memory. Such processing devices can illustratively include particular arrangements of compute, storage and network resources.

The cluster management system 102 and the edge computing sites 105, or components thereof, may be implemented on respective distinct processing platforms, although numerous other arrangements are possible. For example, in some embodiments at least portions of one or more of the edge computing sites 105 and the cluster management system 102 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the cluster management system 102 and the edge computing sites 105, or portions or components thereof, to reside in different data centers. Numerous other distributed implementations are possible.

Additional examples of processing platforms utilized to implement the cluster management system 102, the edge computing sites 105 and other components of the system 100 in illustrative embodiments will be described in more detail below in conjunction with FIGS. 7 and 8.

It is to be appreciated that these and other features of illustrative embodiments are presented by way of example only, and should not be construed as limiting in any way.

Referring to the operational flow 200 in FIG. 2, when a cluster management system 102 is implemented, a certificate authority 120 is created in the cluster management system 102. The certificate authority 120 generates the certificate authority (CA) certificate 121 (CA CRT 121) including a public key and a private key for the certificate authority (CA key 122). The CA key 122 is securely stored in the certificate authority 120. The CA CRT 121 includes a data file that includes information for verifying the identity of the computing device associated with the certificate authority 120, the public key associated with the certificate authority 120 and an expiration date of the CA CRT 121.

Using the CA CRT 121 and the CA key 122, the certificate authority 120 creates a server certificate 123 and a server key 124. The server certificate 123 includes a data file that includes information for verifying the identity of the server associated with the server certificate 123, the public key associated with the server, an identification of the issuing authority of the certificate (e.g., certificate authority 120), and an expiration date of the server certificate 123. The server key 124 is a private key for the server and is securely stored in the server key store 125. The CA CRT 121 and the server certificate 123 are also stored in the server key store 125. In illustrative embodiments, the server key store 125 comprises a TPM. FIG. 4A depicts example pseudocode 401 including commands for generation of the certificate authority 120, and generation and storage of the CA CRT 121, the server certificate 123 and the server key 124. In connection with the secure connection (mTLS secure connection 137) established using a mutual authentication protocol (e.g., mTLS), the ingress controller 133 is configured to read the CA CRT 121, server certificate 123 and server key 124 from the server key store 125. The server key 124 is securely maintained in the server key store 125 and is only readable by the ingress controller 133 without being able to removed or copied from the server key store 125.

When an edge computing site 105 (e.g., ECE) is connected to a network, a zero touch onboarding process is performed to connect the edge computing site to the cluster management system 102 via a secure device onboard connection 135. In illustrative embodiments, Fast ID Online (FIDO) Device Onboarding (FDO) is leveraged to enable zero touch onboarding, which is performed via firmware-based and/or runtime agents. The zero touch onboarding process provides a bootstrapping strategy enabling computing devices (e.g., edge devices) to securely obtain bootstrapping data with no installer action beyond physical placement and connecting network and power cables. As such, the zero touch onboarding processes enable non-technical personnel to bring up computing devices in remote locations without the need for any operator input. The zero touch onboarding processes provide functionality for updating a boot image, committing an initial configuration, and executing arbitrary scripts to address auxiliary needs on computing devices. The updated computing devices are subsequently able to establish secure connections with other systems. Zero touch onboarding processes provide a mechanism for defining a computing device's "good security posture" as described herein. For example, a bare-metal computing device holds a firmware-based secure boot ROM (e.g., a Universal Extensible Firmware Interface (UEFI) secure boot ROM), and the system as a whole is capable of TPM-based Integrity Measurement Architecture (IMA) for measuring boot security, where each boot stage is reported into the TPM's Platform Configuration Register (PCR) registers. IMA security may be defined using various Trusted Computing Group (TCG) Extensible Firmware Interface (EFI) Platform and Protocol specifications. With IMA security, it is possible to assure a high level of confidence regarding: (1) platform consistency and integrity (e.g., a failure of IMA will fail the boot process and initiate a recovery); and (2) device trustworthiness that can be communicated to the control plane.

The FIDO onboarding processing path includes establishing a secure device onboard connection 135 (e.g., TLS or other secured connection) from the SDO client 140 of the edge computing site 105 to the ingress controller 131 and then to the onboarding service 130 of the cluster management system 102. In illustrative embodiments, in connection with the FIDO onboarding process, the onboarding service 130 completes a transfer ownership protocol 0 (TO_0) with a rendezvous server. In completing TO_0, the onboarding service 130 identifies itself to a rendezvous server and establishes the mapping of a Globally Unique Identifier (GUID) to an IP address associated with the onboarding service 130. An edge device (e.g., edge device 170) being onboarded from the edge computing site 105 is initialized following a device initialization (DI) protocol. The DI protocol includes insertion of FIDO device onboard credentials into a device during the manufacturing process. When the device is connected to a network at the edge location, the edge device completes a transfer ownership protocol 1 (TO_1) with the rendezvous server and a transfer ownership protocol 2 (TO_2) with the onboarding service 130. With TO_1, the edge device identifies itself to the rendezvous server, and obtains mapping to connect to the IP address associated with the onboarding service 130. With TO_2, the edge device contacts the onboarding service, establishes trust and then performs ownership transfer. For additional details of the FIDO onboarding process, see FIDO Alliance, *FIDO Device Onboard: A Specification for Automated, Secure IoT Provisioning Technology* (April 2021); LoginID, *FIDO Device Onboarding* (2022), which are incorporated by reference herein.

Figure 5:
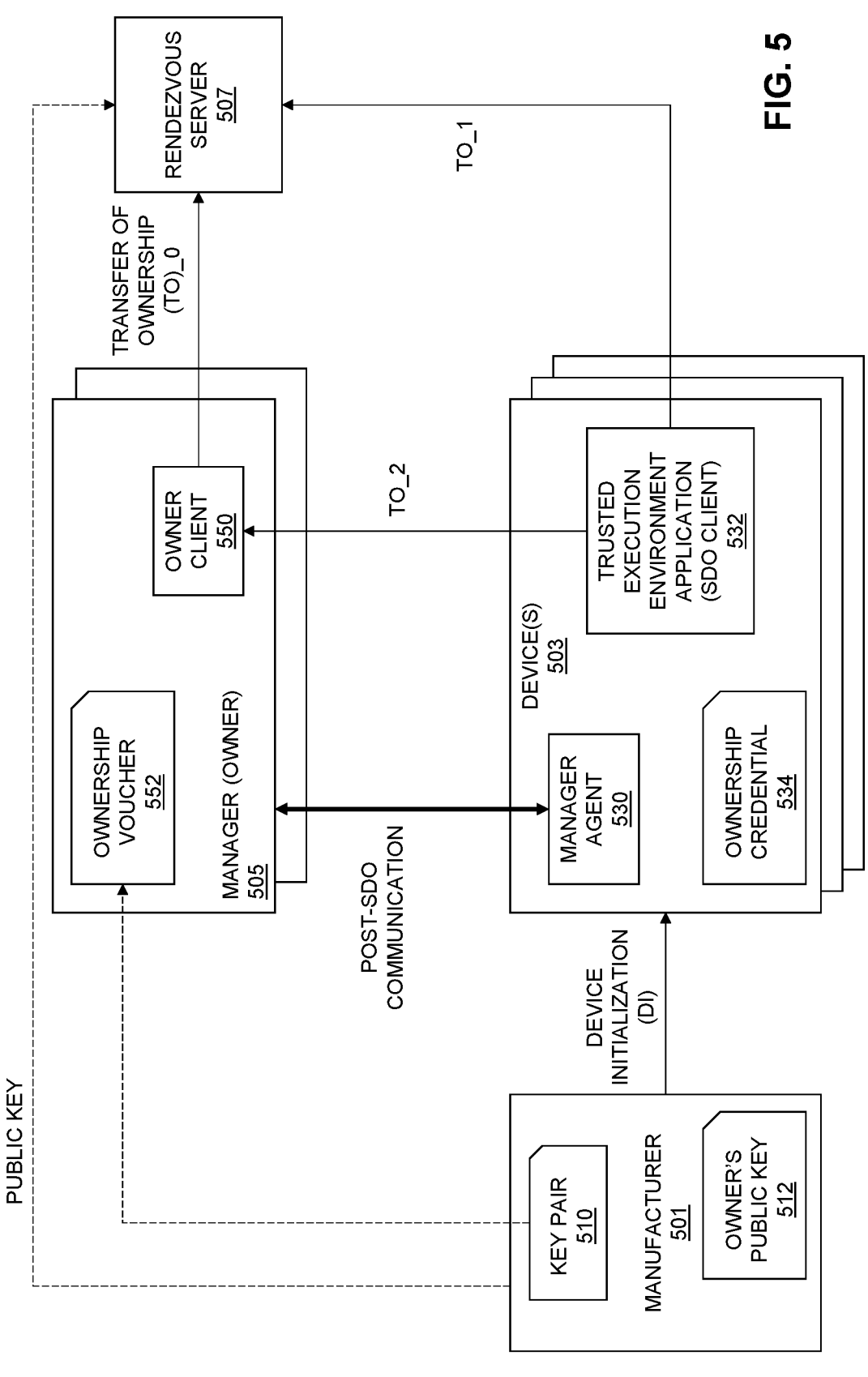
FIG. 5 shows a system flow for a secure device onboarding protocol that may be enabled utilizing multi-phase secure zero touch provisioning in an illustrative embodiment.

FIG. 5 shows an example of an FDO or SDO protocol, involving a manufacturer 501, one or more devices 503, a manager or owner 505, and a rendezvous server 507. The manufacturer 501 manufactures the devices 503. The manufacturer 501 has an associated key pair 510 and the owner's public key 512. The devices 503 implement a manager agent 530 and a trusted execution environment (TEE) application (e.g., an FDO/SDO client 532), and have an ownership credential 534. The manager or owner 505 of the devices 503 implements an owner client 550 and has an ownership voucher 552. The devices 503 may be shipped from the manufacturer 501 (e.g., to one or more customer locations) independent of the ownership voucher 552, and ownership may be transferred multiple times until the devices 503 are powered on. The rendezvous server 507 enables multiple instances of the manager 505 to each register a range of devices which that manager 505 owns. DI includes the key pair 510 of the manufacturer 501 being used to create an initial credential and ownership voucher. The manufacturer 501's certificate (e.g., public key 512) is published to the rendezvous server 507. A device string is configured by the manufacturer 501 and rendezvous server 507's uniform resource locator (URL).

Transfer of ownership (TO) will now be described in more detail. TO may involve multiple steps or phases, denoted TO_0, TO_1 and TO_2. In TO_0, the owner client 550 has the device ID, ownership voucher 552, private key and IP address of the manager 505. The owner client 550 registers with the rendezvous server 507 using the device ID and ownership voucher 552. The rendezvous server 507 verifies the manufacturer 501's public key from the ownership voucher 552, and sets a timer to wait for TO_1. If the device 503 does not contact the rendezvous server 507 within a set time interval, the rendezvous server 507 clears registration and the owner client 550 must repeat TO_0. TO_1 includes the device 503 contacting the rendezvous server 507 with the device ID, and the rendezvous server 507 returning the manager's URL. TO_2 includes the device 503 reaching out to the owner client 550. The manager 505 proves possession of the private key to the device 503, and sends the ownership voucher 552. The device 503 verifies the chain of trust in the ownership voucher 552, and the manager 505 resets the credentials. The manager 505 and device 503 may then perform any required post-SDO communication.

The rendezvous server 507 may provide various discovery options, including those specified in: Internet Engineering Task Force (IETF) Request for Comments (RFC) 8572 Secure Zero Touch Provisioning (SZTP)—DHCP option via 143 SZTP server address; IETF RFC 8552 Scoped Interpretation of DNS Resource Records through "Underscored" Naming of Attribute Leaves—DNS resource record locator; etc. In some embodiments, the rendezvous server 507 may have URLs "rendezvous.customer.com" and "rendezvous-.provider.com" where "provider" may be the name of the manufacturer 501, the manager or owner 505, etc. For air-gapped devices, Yubico® or a 4G-enabled gateway may be utilized. Yubico Yubikey®, for example, may utilize OpenPGP, Open Authentication Time-Based One-Time Password (OATH-TOTP), a Personal Identity Verification (PIV) smartcard interface, FIDO Universal 2nd Factor Authentication (U2F) or FIDO2, and configuration sets for enabling authentication in air-gapped device scenarios.

Figure 6:
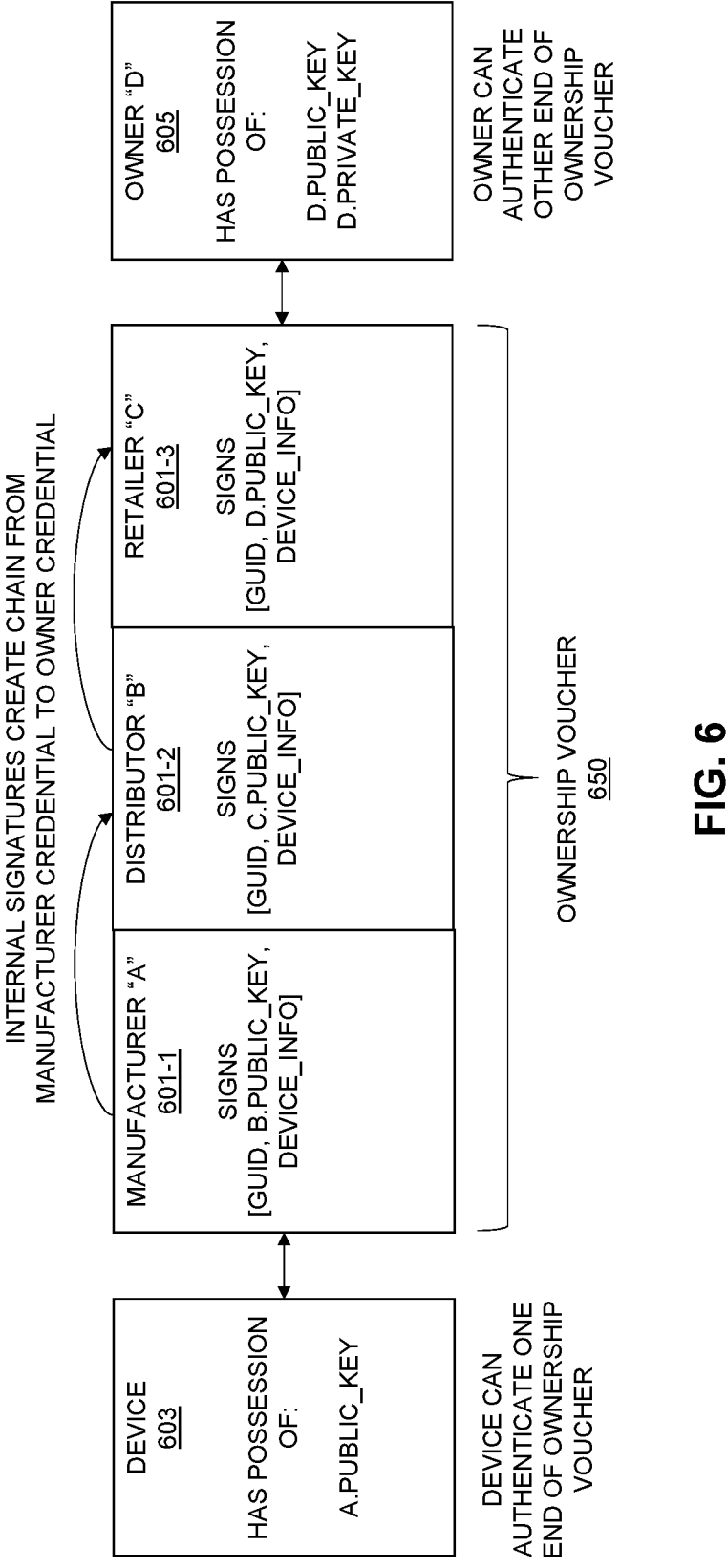
FIG. 6 shows generation of an ownership voucher utilized in secure device onboarding of computing devices in an illustrative embodiment.

FIG. 6 illustrates details of an ownership voucher 650 that is processed by a manufacturer "A" 601-1, a distributor "B" 601-2, and a retailer "C" 601-3. The manufacturer 601-1, distributor 601-2, and retailer 601-3 provide internal signatures which create a chain from the manufacturer to owner credential in the ownership voucher. The manufacturer 601-1 signs the ownership voucher 650 with [GUID, B.Public_Key, Device_Info], the distributor 601-2 signs the ownership voucher 650 with [GUID, C.Public_Key, Device_Info], and the retailer 601-3 signs the ownership voucher 650 with [GUID, D.Public_Key, Device_Info]. The device 603 can authenticate one end of the ownership voucher 650, as it has possession of A.Public_Key. The owner "D" 605 can authenticate the other end of the ownership voucher 650, as it has possession of D.Public_Key and D.Private_Key. The ownership voucher 650 is a structured digital document that links the manufacturer 601-1 with the owner 605, and includes a chain of signed public keys. Each signature of a public key authorizes the possessor of the corresponding private key to take ownership of the device 603 or pass ownership through another link in the chain. The signatures in the ownership voucher 650 thereby create a chain of trust from the manufacturer 601 to the owner 605.

Ownership voucher signing includes initializing a TEE with a hash of the manufacturer 601-1 public key (A.Public_Key). Voucher signing includes encoding the owner 605's public key and signing using the manufacturer 601-1's private key, and updating the ownership voucher 650. The first transfer (e.g., from a first owner to a second owner) of the ownership voucher 650 includes encoding the second owner's public key and signing using the first owner's private key, and updating the voucher. In the FIG. 6 example, the transfer between the manufacturer 601-1 and the distributor 601-2 would thus include the manufacturer 601-1 encoding the distributor 601-2's public key (B.Public_Key) and signing using the manufacturer 601-1's private key (A.Private_Key). Similar processing would be utilized for transfer of the ownership voucher 650 from the distributor 601-2 to the retailer 601-3, and so on.

Verification of the ownership voucher 650 may proceed as follows. The owner 605 may sign a nonce using its private key (D.Private_Key), and send the ownership voucher 650 with the signature (the signed nonce) to the device 603. The device 603 verifies the nonce using the owner 605's public key (D.Public_Key), which verifies that the owner 605 has the corresponding private key (D.Private_Key). The device 603 then gets the manufacturer 601-1's public key (A.Public_Key) from the first entry of the ownership voucher 650, and verifies the hash of the manufacturer 601-1's public key stored in its TEE. The device 603 can then verify the signatures of the ownership voucher 650 in sequence, until it comes to the owner 605's public key (D.Public_Key), which is the last entry of the ownership voucher 650. This means that the chain of ownership is trusted.

Following completion of the transfer ownership protocols TO_0, TO_1 and TO_2, once the SDO client 140 has established the secure channel (e.g., secure device onboard connection 135) with the onboarding service 130, the SDO client 140 and the onboarding service 130 communicate through the secure device onboard connection 135. The secure device onboard connection 135 (e.g., TLS or other secured connection), which is established following the FIDO onboarding process or other secure device onboarding process, is used to exchange certificates before the mutual authentication protocol connection (e.g., mTLS secure connection 137) is established between the edge cluster control plane 160 (e.g., cluster agent 161) and the cluster manager 110.

In more detail, the SDO client 140 generates a private key (client key 151) using TPM 150. The client key 151 is securely maintained in the TPM key store 155 and is not able to be removed or copied from the TPM key store 155. As explained below, the TPM uses the client key 151 to encrypt information sent over the mTLS secure connection 137 and the client key 151 does not leave the TPM 150. The SDO client 140 generates a certificate signing request (CSR) (Domain CSR 145) for signing of a client certificate 162 using the TPM 150. FIG. 4B depicts example pseudocode 402 including commands for generation of the client key 151 key with the TPM 150 and generation of the Domain CSR 145 with the TPM 150. The client certificate 162 includes a data file that includes information for verifying the identity of a client device associated with the client certificate 162 (e.g., an edge device 170 corresponding to the cluster agent 161), the public key associated with the client device, and an expiration date of the client certificate 162.

The SDO client 140 sends the Domain CSR 145 to the onboarding service 130 via the secure device onboard connection 135 and the ingress controller 131. The onboarding service 130 forwards the Domain CSR 145 to the certificate authority 120, which digitally signs the client certificate 162 and returns the signed client certificate 162 to the SDO client 140 via the onboarding service 130, ingress controller 131 and the secure device onboard connection 135. The certificate authority 120 also provides its own certificate (CA CRT 121) to the SDO client 140 via the onboarding service 130, ingress controller 131 and the secure device onboard connection 135. The client certificate 162 and CA certificate 121 are stored in the edge cluster control plane 160. The client (e.g., cluster agent 161) uses the CA certificate 121 to authenticate requests from a server of the cluster management system 102. FIG. 4C depicts example pseudocode 403 including commands for return of a signed client certificate 162 and provision of a certificate authority certificate (CA CRT 121) from the cluster management system 102 to the edge computing site 105.

The SDO client 140 saves the client certificate 162 and CA certificate 121 in a predefined location (e.g., edge cluster control plane 160) so that the cluster agent 161 can read the client certificate 162 and CA certificate 121 in connection with transmitting and receiving encrypted information over mTLS secure connection 137. Following receipt and saving of the signed client certificate 162 and CA certificate 121, the operation of the SDO client 140 can be terminated (e.g., SDO client 140 can be deactivated).

Using the CA certificate 121 to validate the server certificate 123, the client certificate 162 and the client key 151, the cluster agent 161 establishes the mTLS secure connection 137 with the cluster manager 110 via the ingress controller 133. As noted herein, the client key 151 does not leave the TPM 150, but instead the TPM 150 uses the client key 151 to encrypt communications over the mTLS secure connection 137. FIG. 4D depicts example pseudocode 404 including commands for using client URL (curl) command-line tool to establish the mTLS secure connection 137 with the cluster manager 110 using the CA certificate 121, the client certificate 162 and the client key 151.

An exemplary process for secure communications between a computing device cluster and a cluster management system will now be described in more detail with reference to the flow diagram of FIG. 3. It is to be understood that this particular process is only an example, and that additional or alternative processes for secure communications between a computing device cluster and a cluster management system may be used in other embodiments.

In this embodiment, the process 300 includes steps 302 through 308. These steps are assumed to be performed by one or more elements of an edge computing site 105 such as, for example, the SDO client 140 and the edge cluster control plane 160. In some embodiments, portions of the steps 302 through 308 or other process steps described below may be performed by one or more elements of the cluster management system 102. The process begins with step 302, establishing a first secure communication channel (e.g., secure device onboard connection 135) between at least one edge computing site (e.g., edge computing site 105) and a management system (e.g., cluster management system 102). The first secure communication channel may utilize a TLS protocol and is established in response to secure device onboarding of the at least one edge computing site. In step 304, a CSR (e.g., Domain CSR 145) is sent over the first secure communication channel from the at least one edge computing site to the management system. In step 306, in response to the CSR, a digitally signed certificate for the at least one edge computing site (e.g., client certificate 162) and a certificate authority certificate (e.g., CA CRT 121) are received over the first secure communication channel from the management system. In step 308, a second secure communication channel between the at least one edge computing site and the management system (e.g., mTLS secure connection 137) is established. The second secure communication channel utilizes a mutual authentication protocol (e.g., mTLS). The certificate authority certificate and the digitally signed certificate are used to establish the second secure communication channel.

The CSR is generated using a TPM (e.g., TPM 150). In addition, a private key for the at least one edge computing site (e.g., client key 151) is generated using the TPM. The private key is stored in the TPM (e.g., in TPM key store 155) and is used in addition to the certificate authority certificate and the digitally signed certificate to establish the second secure communication channel.

In illustrative embodiments, the at least one edge computing site comprises an edge cluster (e.g., cluster of edge devices 170) and the management system comprises a cluster management system (e.g., cluster management system 102). The certificate authority certificate (e.g., CA CRT 121) and a certificate authority private key (e.g., CA key 122) are generated by the management system (e.g., by certificate authority 120 as a component of the cluster management system 102). The certificate authority certificate and the certificate authority private key are used by the management system to generate a server certificate (e.g., server certificate 123) and a server private key (e.g., server key 124). The management system stores the certificate authority certificate, the server certificate and the server private key in a key store (e.g., server key store 125). An ingress controller for the management system used in connection with the second secure communication channel (e.g., ingress controller 133) reads the certificate authority certificate, the server certificate and the server private key from the key store.

Illustrative embodiments provide techniques for secure provisioning of computing devices and for establishing and maintaining secure communications between a computing device cluster and a cluster management system. The embodiments provide improvements over conventional cluster management systems (e.g., Rancher® or Kubernetes cluster management systems) that do not support mTLS, and rely on token-based authentication where tokens can be intercepted or leaked.

As an additional advantage, the embodiments use SDO techniques like FIDO onboarding processes to enable zero-touch provisioning in edge environments. Unlike previous approaches, the embodiments provide technical solutions that utilize a combination of TPM, SDO and mTLS techniques to establish zero-trust security between the cluster managers and cluster agents. In the illustrative embodiments, private keys and mTLS connections are protected by a TPM, thereby reducing or eliminating the possibility of security compromises when compared with current shared key approaches. Additionally, the embodiments are not necessarily limited to edge environments, and the zero-trust and zero touch techniques described herein may also be used to establish and maintain secure communications in other uses cases with similar requirements.

In some embodiments, in addition to the security protocols discussed herein, one or more secure connections may also utilize, for example, one or more of a private Virtual Private Network (VPN), Internet Protocol Security (IPsec), encrypted Virtual Local Area Network (VLAN), secured Secure Shell (SSH), Hypertext Transfer Protocol Secure (HTTPS), Hypertext Transfer Protocol (HTTP) Strict-Transport-Security (HSTS) if it is feasible to do so.

In some embodiments, the provisioning and/or secure connections may conform to various platform security standards, such as National Institute of Standards and Technology (NIST) Special Publication (SP)-800-193 Platform Firmware Resiliency Guidelines, NIST SP-800-207 Zero Trust Architecture, Federal Information Processing Standards Publication (FIPS) 140-3 Security Requirements for Cryptographic Modules, and International Standards Organization (ISO) 28000:2007 Specification for security management systems for the supply chain, etc. The provisioning and/or secure connection processing described herein further enables device integrity assurance functionality, including but not limited to: device tamper detection; boot attestation from Power-On Self-Test (POST) through operating system (OS) hand-over; continuous Chain-of-Trust from POST via TPM; secure boot with end-to-end cryptographic support; OS Machine Owner Key (MOK) cryptographically signed key to device only; OS boot processes which cannot be interrupted or intercepted; hardware configuration change detection and notification; measured boot processing; FIDO compliant secure on-boarding; trusted execution environment (e.g., meeting NIST SP-800-207 Zero Trust Architecture specifications); etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for provisioning of computing devices and establishing and maintaining secure communications between a computing device cluster and a cluster management system will now be described in greater detail with reference to FIGS. 7 and 8. Although described in the context of system 100, these platforms may also be used to implement at least portions of other information processing systems in other embodiments.

Figure 7:
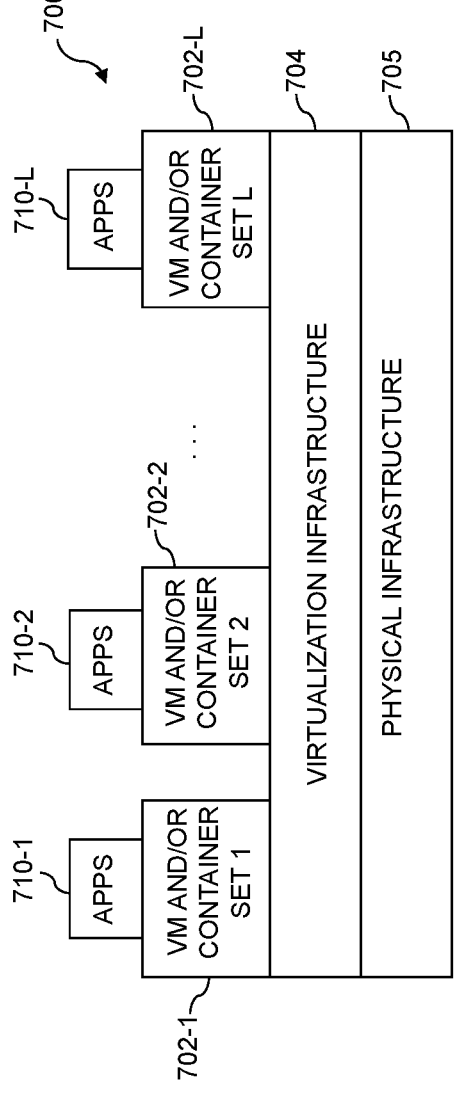
FIGS. 7 and 8 show examples of processing platforms that may be utilized to implement at least a portion of an information processing system in illustrative embodiments.
Figure 8:
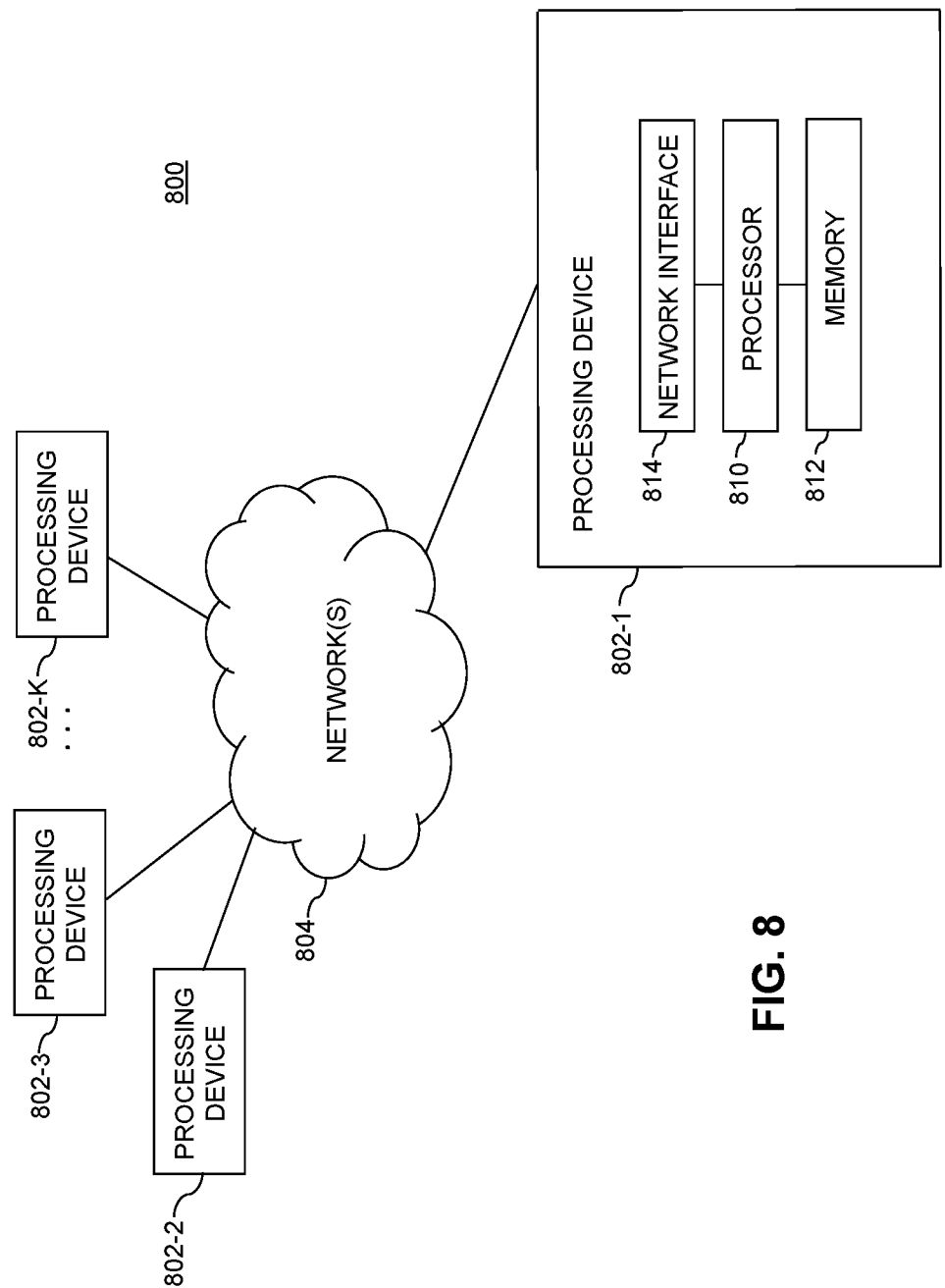

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for multi-phase secure zero touch provisioning of computing devices as disclosed herein are illustratively implemented in the form of software running on one or more processing devices. It should again be emphasized that the above-described embodiments are presented for purposes of illustration only. Many variations and other alternative embodiments may be used. For example, the disclosed techniques are applicable to a wide variety of other types of information processing systems, computing devices, provisioning processes, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
establishing a first secure communication channel between at least one edge computing site and a management system;
sending a certificate signing request over the first secure communication channel from the at least one edge computing site to the management system;
receiving, over the first secure communication channel from the management system in response to the certificate signing request, a digitally signed certificate for the at least one edge computing site and a certificate authority certificate; and
establishing a second secure communication channel between the at least one edge computing site and the management system, wherein the second secure communication channel utilizes a mutual authentication protocol, and the certificate authority certificate and the digitally signed certificate are used to establish the second secure communication channel.

2. The apparatus of claim 1 wherein the at least one processing device is further configured to perform the step of generating the certificate signing request using a trusted platform module.

3. The apparatus of claim 1 wherein the at least one processing device is further configured to perform the step of generating a private key for the at least one edge computing site using a trusted platform module.

4. The apparatus of claim 3 wherein the private key is used in addition to the certificate authority certificate and the digitally signed certificate to establish the second secure communication channel.

5. The apparatus of claim 3 wherein the private key is stored in the trusted platform module.

6. The apparatus of claim 1 wherein the mutual authentication protocol comprises a mutual transport layer security protocol.

7. The apparatus of claim 6 wherein the first secure communication channel utilizes a transport layer security protocol.

8. The apparatus of claim 1 wherein the first secure communication channel is established in response to secure device onboarding of the at least one edge computing site.

9. The apparatus of claim 1 wherein the at least one edge computing site comprises an edge cluster and the management system comprises a cluster management system.

10. The apparatus of claim 1 wherein the certificate authority certificate and a certificate authority private key are generated by the management system.

11. The apparatus of claim 10 wherein the certificate authority certificate and the certificate authority private key are used by the management system to generate a server certificate and a server private key.

12. The apparatus of claim 11 wherein the management system stores the certificate authority certificate, the server certificate and the server private key in a key store.

13. The apparatus of claim 12 wherein an ingress controller for the management system used in connection with the second secure communication channel reads the certificate authority certificate, the server certificate and the server private key from the key store.

14. A computer program product comprising a non-transitory processor-readable storage medium having stored therein program code of one or more software programs, wherein the program code when executed by at least one processing device causes the at least one processing device to perform steps of:
establishing a first secure communication channel between at least one edge computing site and a management system;
sending a certificate signing request over the first secure communication channel from the at least one edge computing site to the management system;
receiving, over the first secure communication channel from the management system in response to the certificate signing request, a digitally signed certificate for the at least one edge computing site and a certificate authority certificate; and
establishing a second secure communication channel between the at least one edge computing site and the management system, wherein the second secure communication channel utilizes a mutual authentication protocol, and the certificate authority certificate and the digitally signed certificate are used to establish the second secure communication channel.

15. The computer program product of claim 14 wherein the program code further causes the at least one processing device to perform step of generating a private key for the at least one edge computing site using a trusted platform module.

16. The computer program product of claim 15 wherein the private key is used in addition to the certificate authority certificate and the digitally signed certificate to establish the second secure communication channel.

17. The computer program product of claim 14 wherein the at least one edge computing site comprises an edge cluster and the management system comprises a cluster management system.

18. A method comprising:
establishing a first secure communication channel between at least one edge computing site and a management system;
sending a certificate signing request over the first secure communication channel from the at least one edge computing site to the management system;
receiving, over the first secure communication channel from the management system in response to the certificate signing request, a digitally signed certificate for the at least one edge computing site and a certificate authority certificate; and
establishing a second secure communication channel between the at least one edge computing site and the management system, wherein the second secure communication channel utilizes a mutual authentication protocol, and the certificate authority certificate and the digitally signed certificate are used to establish the second secure communication channel.

19. The method of claim 18 further comprising generating a private key for the at least one edge computing site using a trusted platform module.

20. The method of claim 19 wherein the private key is used in addition to the certificate authority certificate and the digitally signed certificate to establish the second secure communication channel.

* * * * *